Patented Dec. 28, 1948

2,457,641

UNITED STATES PATENT OFFICE 2,457,641

WAX TREATMENT OF UNCURED RUBBER GOODS

Fred H. Bunn, Westfield, N. J., assignor to S. C. Johnson & Son, Inc., Racine, Wis., No Drawing. Application November 1, 1946, Serial No. 707,345

6 Claims. (Cl. 18—53)

This invention relates to a method of treating rubber goods. More particularly, it relates to an improved method for treating uncured rubber goods, such as rubber footwear, with an aqueous wax emulsion.

Heretofore, the practice has been in the rubber goods industry to apply a lacquer coating to rubber goods, such as rubber footwear, not only to provide an improved appearance to the finished article, but also to provide protection from scratches, etc. especially during the period the article is stored prior to sale. This type of coating is often referred to as a "shop coating."

The lacquer treatment has several disadvantages. For example, because of the fire hazard due to the volatile solvent in the lacquer, the articles before spraying must be removed from the truck racks usually used to move them, so as to prevent any of the solvent being absorbed by the trucks. This adds greatly to the time necessary to spray the articles. Another disadvantage of using lacquer is that a thick coat is usually applied to eliminate possibility of misses during spraying, and this coat is then subject to chipping and marring when the article is subsequently handled.

Although the advantages of treating rubber articles with wax in order to provide a protective coating and improved appearance are well known, manufacturers of rubber goods heretofore showed little interest in the use of a wax treatment of their products as it involves an additional operation to apply the wax finish after curing, and because they already had applied a lacquer finish before curing.

It was heretofore thought impossible to apply an aqueous wax emulsion before curing because the use of an aqueous wax emulsion to treat rubber in the molds had not proven successful. It was thought that because of the temperatures involved in curing would so break down the wax that there would be no wax surface finish when the article was cured.

Therefore, in accordance with my invention, an improved method has been developed which comprises treating rubber goods, such as rubber footwear, prior to curing with an aqueous wax emulsion. The aqueous wax emulsion may be applied, for example, by brushing, wiping or spraying.

Now, having indicated in a general way, the nature and purpose of this invention, the following examples will illustrate the invention. It is to be understood, however, that such examples are presented merely as illustrations of the invention and are not to be construed as limiting the same. In the examples, the ingredients are given in parts by weight, unless otherwise indicated.

Example 1

An aqueous wax emulsion was prepared by melting 136.5 pounds of carnauba wax in a suitable vessel by heating to about 200° F. There was then added 27 pounds of oleic acid, followed by 12.4 pounds of morpholine. The temperature was maintained at about 200° F. and water was slowly added at a rate so as to maintain a transparent gel during the time the gel continued to absorb the water. The addition of water is continued at this rate until the gel breaks. The emulsion was then diluted with additional water until the total water content of the emulsion was about 70 gallons.

Example 2

A portion of the emulsion prepared as in Example 1 was diluted with equal parts by weight of water. An entire truck rack containing about 45 to 50 uncured rubber boots was then sprayed with this composition. The spray gun used was a De Vilbis NBC, with a nozzle AV-15-FX-N and Needle NBC 444-F. using about 70-80 pounds of air pressure. After the sprayed rubber boots were allowed to air dry for about 15-20 minutes, the truck rack was then wheeled into a curing room. The curing started at around 230° F. with hot air and the temperature increased in about 30 minutes to about 260° F., allowed to remain at that temperature for an additional 30 minutes. The heat was then changed from hot air to steam and the temperature increased to 275° F. and allowed to remain at that temperature for an additional 30 minutes. The truck rack was allowed to cool and then removed from the curing room. The cured rubber boots had a protective wax coating and an improved appearance. It was found that the wax had penetrated the rubber and became an integral part of the rubber. The coating therefore was less liable to chip or mar during storage. It was also found that from 9 to 12 minutes per rack was saved in each spraying operation over lacquer spraying since the rubber boots need not be removed from the truck rack during spraying.

While in the aqueous wax emulsion shown, oleic acid and morpholine have been used as the emulsifying agent, this is not intended to be a limitation on the use of other wax emulsifying agents such as triethanolamine, sodium salts of fatty acids, and the like.

Although carnauba wax has been used in preparing the emulsion, other waxes, resins and mixtures thereof may be used either in toto or in part.

While a temperature of 200° F. was used in the preparation of the emulsion, this temperature may be varied over a wide range as taught by the art.

While in Example 2, the application of the aqueous wax emulsion was by a specific type of spray gun, it will be appreciated that other types of spray guns or spray systems may be used. Experience has taught a fine spray is more efficient and does not leave drops or spots on the rubber. If desired, the aqueous wax emulsion may be brushed on, wiped on or applied by other known methods.

The aqueous wax emulsion should not be applied too wet to the uncured rubber goods. It is recommended that the usual commercial emulsion be diluted with equal parts of water as was done in Example 2. However, individual cases may warrant further adjusting the concentration of the emulsion.

While a typical curing cycle has been shown in Example 2, it will be understood that this is shown by way of illustration only. This curing operation may be varied as desired.

While rubber boots have been used in illustration of rubber goods, to be treated in accordance with this invention, the process is applicable to other rubber goods, such as other rubber footwear, rubber toys, and the like which are preformed from rubber stock prior to curing.

There are a number of advantages in applying a wax emulsion rather than a lacquer to the rubber goods.

1. By the use of an aqueous wax emulsion, the fire hazard incidental to the use of lacquer is eliminated.

2. The coating itself, becomes an integral part of the rubber, rather than a surface coating subject to chipping and marring.

3. By the use of this process an entire rack or racks of rubber goods may be sprayed directly without the necessity of removal from the racks prior to spraying. This is a substantial saving in handling and in time which results in substantial savings and increased output without increasing equipment.

Other modes of applying the principle of the invention may be employed instead of those explained, change being made as regards the method herein disclosed, provided the step or steps stated by any of the following claims or the equivalent of such stated step or steps be employed.

I claim:

1. A method of treating rubber goods preformed from sheet rubber comprising coating the rubber goods prior to curing with an aqueous wax emulsion and then heating said rubber goods by direct contact of a fluid medium at a temperature within the range from about 230° F. to about 275° F. until said rubber goods are cured.

2. A method of treating rubber goods preformed from sheet rubber comprising spraying the rubber goods prior to curing with an aqueous wax emulsion and then heating said rubber goods by direct contact of a fluid medium at a temperature within the range from about 230° F. to about 275° F. until said rubber goods are cured.

3. A method of treating rubber goods preformed from sheet rubber comprising brushing the rubber goods prior to curing with an aqueous wax emulsion and then heating said rubber goods by direct contact of a fluid medium at a temperature within the range from about 230° F. to about 275° F. until said rubber goods are cured.

4. A method of treating rubber goods preformed from sheet rubber comprising wiping the rubber goods prior to curing with an aqueous wax emulsion and then heating said rubber goods by direct contact of a fluid medium at a temperature within the range from about 230° F. to about 275° F. until said rubber goods are cured.

5. A method of treating rubber footwear preformed from sheet rubber comprising spraying the rubber footwear prior to curing with an aqueous wax emulsion and then heating said rubber footwear by direct contact of a fluid medium at a temperature within the range from about 230° F. to about 275° F. until said rubber goods are cured.

6. A method of treating rubber boots preformed from sheet rubber comprising coating the rubber boots prior to curing with an aqueous wax emulsion, and then heating said rubber boots by direct contact of a fluid medium at a temperature within the range from about 230° F. to about 275° F. until said rubber boots are cured.

FRED H. BUNN.

REFERENCES CITED

The following references are of record in the file of this patent:

UNITED STATES PATENTS

| Number | Name | Date |
| --- | --- | --- |
| 817,408 | Wall | Apr. 10, 1906 |
| 1,580,966 | Dales et al. | Apr. 13, 1926 |
| 1,592,853 | Hoffman et al. | July 20, 1926 |
| 1,872,046 | Teague | Aug. 16, 1932 |
| 2,242,264 | Roberts | May 20, 1941 |

FOREIGN PATENTS

| Number | Country | Date |
| --- | --- | --- |
| 365,466 | Great Britain | Jan. 21, 1932 |